United States Patent [19]
Radtchenko

[11] Patent Number: 4,926,577
[45] Date of Patent: May 22, 1990

[54] QUICK GLIDING LURE

[76] Inventor: Konstantin Radtchenko, 235 Manhattan Ave., Jersey City, N.J. 07307

[21] Appl. No.: 300,943

[22] Filed: Jan. 24, 1989

[51] Int. Cl.⁵ ............................................. A01K 85/00
[52] U.S. Cl. ...................................... 43/42; 43/42.22; 43/42.36; 43/42.45; 43/42.5
[58] Field of Search ................... 43/42, 42.22, 42.36, 43/42.42, 42.44, 42.45, 42.43, 42.47, 42.48, 42.49, 42.5

[56] References Cited
U.S. PATENT DOCUMENTS

| | | | |
|---|---|---|---|
| 2,038,127 | 10/1931 | Pflueger | 43/42.45 |
| 2,512,913 | 11/1945 | Boice | 43/42.45 |
| 3,024,562 | 8/1958 | Halling | 43/42.48 |
| 3,044,207 | 7/1962 | Dorsett | 43/42.22 |
| 3,126,661 | 11/1962 | Phillips | 43/42.5 |
| 3,205,608 | 9/1965 | Dickinson | 43/42.49 |
| 3,817,922 | 8/1956 | Takeshita | 43/42.42 |
| 4,134,224 | 1/1978 | Clark | 43/42.5 |
| 4,796,375 | 1/1989 | Wilson | 43/42.45 |

OTHER PUBLICATIONS

202,112 Design Patent U.S. Class 43, sub. 42.45, by Storm, Aug. 31, 1965.

Primary Examiner—Nicholas P. Godici
Assistant Examiner—Mike Starkweather
Attorney, Agent, or Firm—Ilya Zborovsky

[57] ABSTRACT

A quick glide lure has in a vertical longitudinal cross section a shape which corresponds to the shape of half of a falling water drop with a front downwardly convex portion and a rear downwardly concave portion of a lower edge.

16 Claims, 3 Drawing Sheets

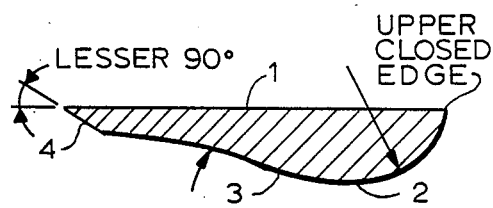
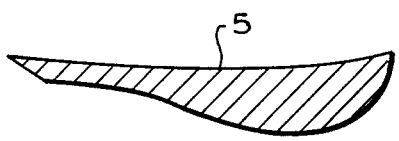
FIG. 1  FIG. 2
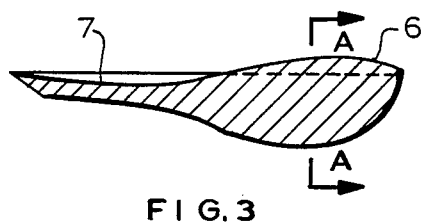
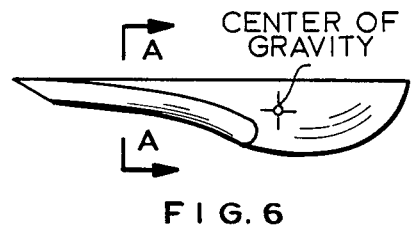
FIG. 3  FIG. 6
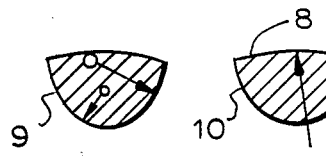 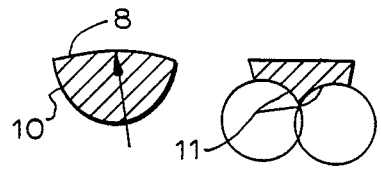 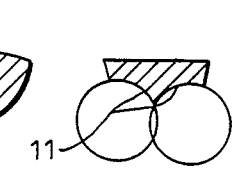 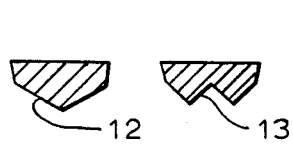
FIG.4  FIG.5  FIG.7  FIG.8  FIG.9
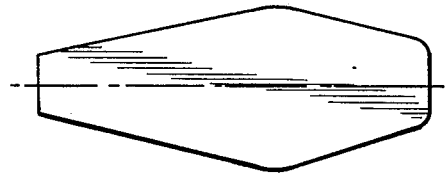
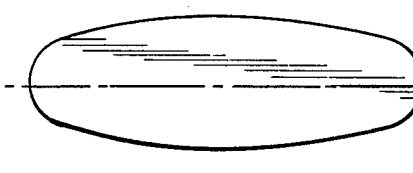
FIG. 10  FIG. 12
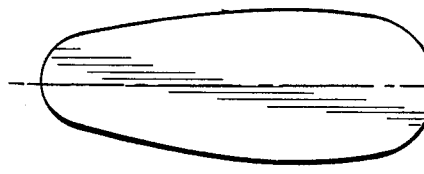
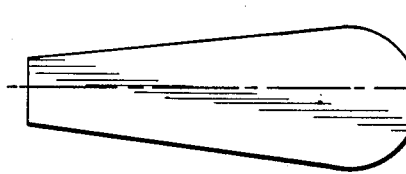
FIG. 11  FIG. 13

QUICK GLIDING LURE

BACKGROUND OF THE INVENTION

The present invention relates to artificial lures.

Artificial lures which glide in water and widely known and used in great variety of constructions. Their purpose is to attract fish during gliding. It is advisable to propose new gliding artificial lures which have a higher attractiveness for fish and therefore can increase the fishing take.

SUMMARY OF THE INVENTION

Accordingly, it is an object of the present invention to provide a quick gliding lures which has a high attractiveness for fish.

In keeping with these objects and with others which will become apparent hereinafter, one feature of the present invention resides, briefly stated, in a quick gliding lure which has a cross section substantially corresponding to a cross section of a half of a falling water drop with a forward downwardly convex portion and a rearward downwardly concave portion.

When the artificial lure has the shape in accordance with the present invention, its resistance to water is reduced and therefore the speed of its gliding is increased. Also, the center of gravity of the lure is displaced toward the front end of the lure. The thusly designed lure has an angle of gliding of 20°–50° relative to a vertical line, so that the following tangential component of the weight of the lure is obtained:

$$P_{sin}[90° - (20° \div 50°)] = 0.9 - 0.7P$$

This tangential component provides for a maximal speed of gliding of the lure, which attracts attention of fish of prey and increase the fishing take.

The novel features of the present invention are set forth in particular in the appended claims. The invention itself, however, both as to its construction and its manner of operation will be beat understood from the following description of preferred embodiments, which is accompanied by the following drawings.

BRIEF DESCRIPTION OF THE DRAWINGS

FIGS. 1, 2 and 3 are view which show longitudinal cross sections of a lure in accordance with first three embodiments of the present invention;

FIGS. 4 and 5 show transverse cross sections of FIG. 3 in accordance with two embodiments of the present invention;

FIGS. 7–9 show cross sections of three further embodiments, taken in FIG. 6, with stabilizing formations;

FIGS. 10–13 show plan views of the lure in accordance with further embodiments of the present invention;

DESCRIPTION OF PREFERRED EMBODIMENTS

Figure 14:
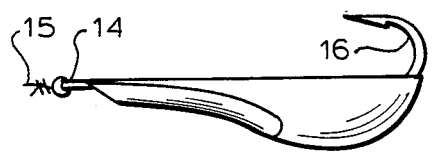
FIGS. 14, 15 and 16, 17 show two further embodiments of the inventive lure as to the connection of fishing hooks and lines.

A lure in accordance with the present invention has a cross section which substantially corresponds to a cross section of a half of a falling water drop. As shown in FIG. 1 the body has an upper flat surface 1 and a lower surface which includes a front downwardly convex surface portion 2, a rear downwardly concave portion 3, and a rearmost small section 4 which is inclined from the portion 3 upwardly and rearwardly toward the upper surface 1.

In the lure shown in FIG. 2 the body has an upper surface 5 which is upwardly concave. The lower surface of this body corresponds to that of the body of FIG. 1.

In the lure shown in FIG. 3 the upper surface has an upwardly convex front portion 6 and an upwardly concave rear portion 7. As shown in FIGS. 4 and 5, the transverse cross section of the body is limited from above by a curved line 8 which can be arcuate. This cross section can be limited from below by curved lines 9 and 10 of different radii as shown in FIGS. 4 and 5.

For preventing lateral tilting of the lure and its spinning, the lower surface of the body can be provided with stabilizing formations. In FIG. 7 the stabilizing formation is formed as a central keel defined between two toroidal spherical surfaces as identified with reference numeral 11. In FIG. 8 a stabilizing keel 12 is formed by two conical surfaces. In FIG. 9 the stabilizing keel 13 is formed as a W-shaped projection.

FIGS. 10–13 shows the lures which the bodies having a pyramidal shape, an oval shape, an oval-triangular shape, and a prism-triangular shape. More particularly, the greatest cross section of the pyramid of the body of FIG. 10 is located closer to the front end, the greatest cross section of the oval-triangle of FIG. 11 is located at the front end, and a rounded surface of the prism-triangle of FIG. 13 which is the greatest is also located at the front end of the body.

Figure 16:
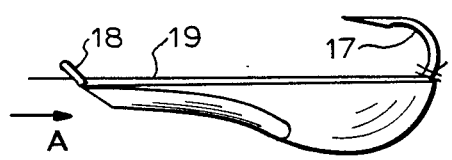
Figure 15:
Figure 17:
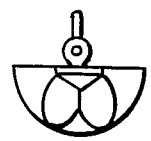
Figure 18:
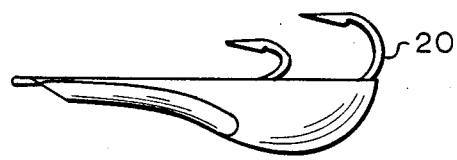
FIGS. 18–21 show further embodiments of the connections of the fishing hooks to the lure.
Figure 20:
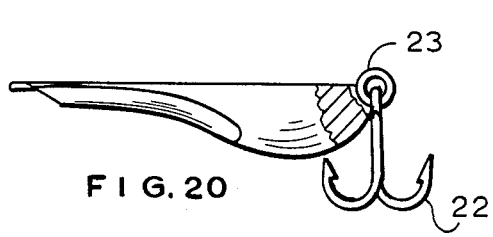
Figure 19:
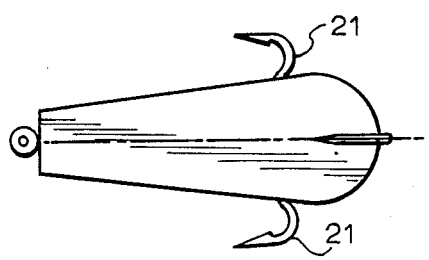
Figure 21:
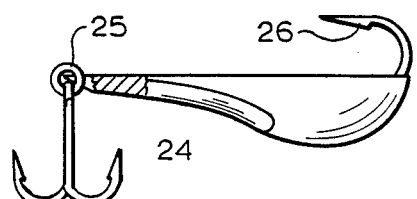

In the lure of FIGS. 14 and 15 the rear end of the body is provided with a loop 14 for connecting a fishing line 15, while a fishing hook 16 is connected with the front end of the body. In the lure of FIGS. 16 and 17 the fishing hook 17 is connected with the front end of the body while the fishing line 19 extends through a rear rearwardly inclined loop 18 attached to the rear end of the body. In FIGS. 18 and 19 there are one front hook 20 and two lateral hooks 21 attached to the sides of the body. In FIG. 20 a hook 22 is attached to a loop 23 at the front end of the body, while in FIG. 21 a hook 24 is connected with a loop 25 at the rear end of the body and another hook 26 is fixedly connected with the front end of the body.

Figure 22:
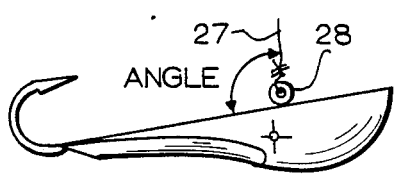
FIGS. 22–25 show inventive lures provided with openings in accordance with further embodiments.
Figure 23:
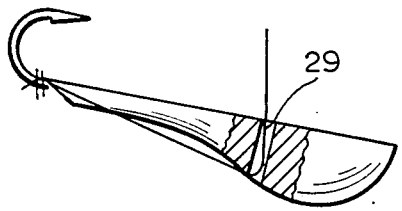

In the embodiment of FIG. 22 a fishing line 27 is attached to the body by a loop 28 which is located on a line which extends through the center of gravity of the body at an angle to an upper surface of the body, which is selected for a desired located of the longitudinal line of the lure during fishing. The same result is achieved in FIG. 23 in which instead of the loop a trough opening 29 is provided in the body at the above specified location.

Figure 24:
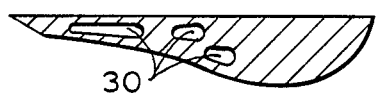
Figure 25:
Figure 26:
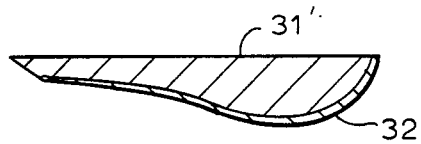
FIGS. 26 and 27 show the lures composed of different materials.
Figure 27:
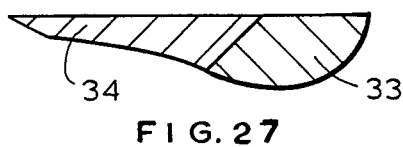

FIG. 24 shows the body of the lure with closed holes 30, while FIG. 25 shows holes 31 in the body and communicating with an exterior of the body. The lures of FIGS. 26 and 27 are composed of at least two parts of different materials, wherein the lure of FIG. 26 has a main upper part 31 and a small lower part 32 of different materials, while the lure of FIG. 27 has a front part 33 and a rear part 34 of different materials. The materials differ from one another by their density weight. For example the materials can be metal and plastic.

Figures 28, 29:
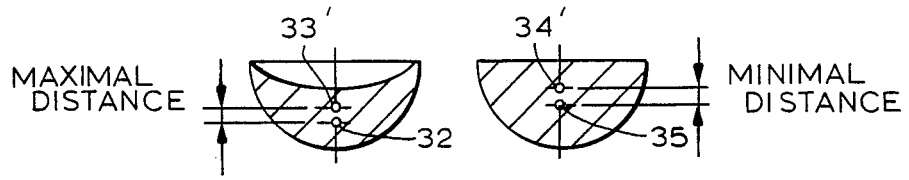
FIGS. 28–31 show further embodiments of the inventive lure.

In the embodiment of FIG. 28 the body is designed so that its center of gravity 32 is located lower than its center of resistance force of water 33. In this case the distance between the centers must be maintained at a maximum value. In the embodiment of FIG. 29 a center of gravity 34 is located higher than a center of resistance force 35, and in this case the distance between the centers must be maintained as small as possible, to provide a return of the body to the position shown in these Figures, during fishing.

Figure 30:
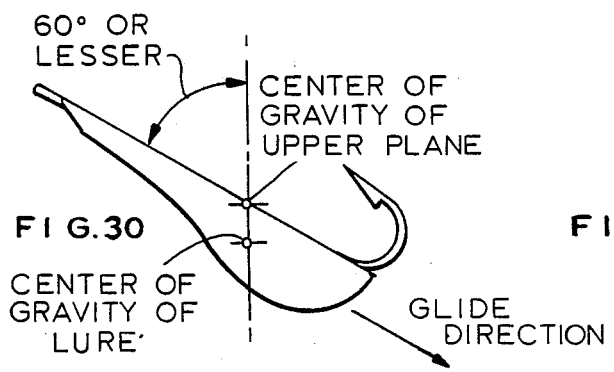
Figure 31:
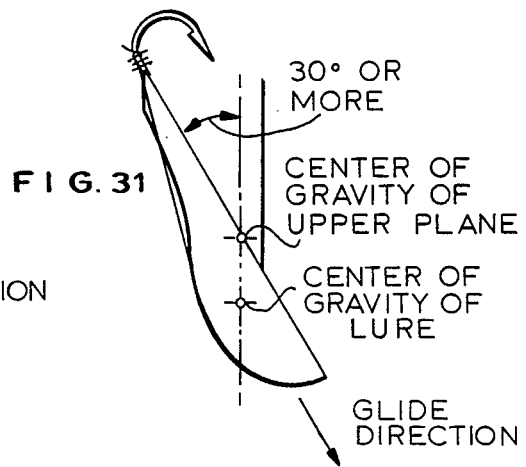
Figure 32:
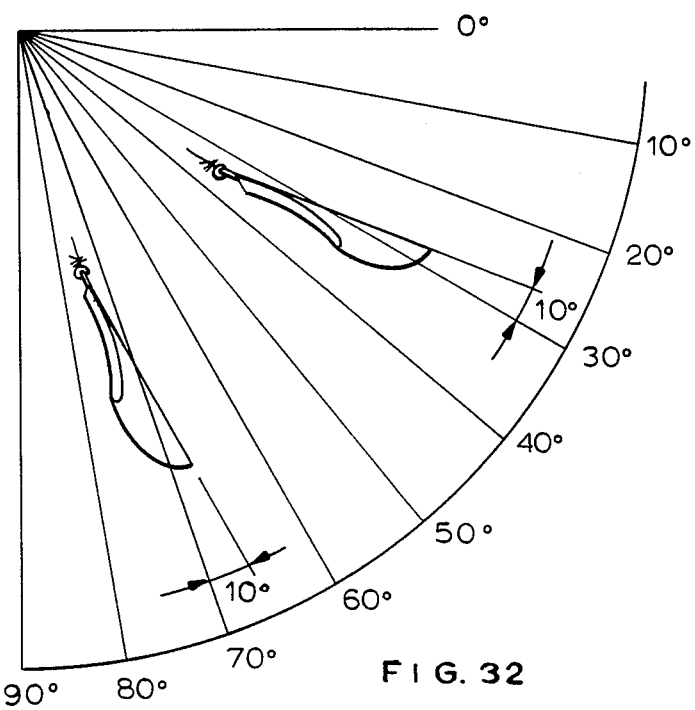
FIG. 32 illustrate a range of gliding angles of the artificial lures.

The body of the lures must be designed so that an angle between the line which connects the center of the upper surface with the center of gravity of the body and the line connecting the rear and front upper ends of the body is between 60° (FIG. 30) and 30° (FIG. 31). As can be seen from FIG. 32, during gliding the lure glides at an angle of between 40° and 70°, since under the action of its weight the above mentioned angles of FIGS. 30 and 31 are increased by approximately 10°.

Fishing with the lure in accordance with the present invention is preformed in the following manner:

When the fishing line is connected to the rear end of the lure, the lure is sharply left up to 0.5–2 feet, then sharply lowered, then keep it still for several seconds, and repeat the cycle.

When the fishing line is connected near the center of gravity of the body, the lure is sharply lowered to 0.5–2 feet, and then lift it by short joits to the initial level, keep it still for several seconds, and repeat the cycle.

It should be additionally emphasized that the greatest width of the body of the inventive lure is provided at its uppermost surface.

The invention is not limited to the details shown since various modifications and structural changes are possible without departing in any way from the spirit of the present invention.

What is desired to be protected by Letters Patent is set forth in particular in the appended claims.

I claim:

1. A quick glide fish lure comprising an elongated body, said body as viewed by a longitudinal vertical cross section comprises:
   (a) an upper facing surface extending the length of said body;
   (b) a rear portion extending from a rearward most tip to a vertical plane, generally perpendicular with said surface, and bisecting said bodies center of gravity;
   (c) a front portion extending from a frontward most tip to the center of gravity plane;
   (d) a front lower surface having a downwardly convex shape beginning at said front tip and running to said center of gravity plane;
   (e) a first rearward lower surface having a downwardly concave shape which connects and transitions from the convex shape at the center of gravity plane and then arcs towards said rearward tip;
   (f) a second rearward lower surface, descending from said rearward tip toward said front at an angle less than 90 degrees from said upper surface and connecting said first rearward lower surface; and
   (g) at least one fish hook attached to said body.

2. A quick glide lure as defined in claim 1, wherein said body has an upper surface which is upwardly concave.

3. A quick guide lure as defined in claim 1, wherein said body has a lower stabilizing projection formed by two torus surfaces.

4. A quick glide lure as defined in claim 1, wherein said body has a lower stabilizing projection formed by two conical surfaces.

5. A quick glide lure as defined in claim 1, wherein said body has a lower stabilizing projection which has a W-shaped transverse cross section.

6. A quick glide lure as defined in claim 1, wherein said body has a transverse cross section formed so that an angle between the line connecting two points on an upper edge thereof and a tangent line to any point on a lateral edge is less than 90°.

7. A quick glide lure as defined in claim 1, wherein said upper surface includes a plurality of portions having different curvatures.

8. A quick glide lure as defined in claim 1, wherein said fishing hook is attached to said front end and extending upwardly, and a loop attached to said rear end for connecting with a fishing line, said loop being located on a longitudinal axis of said body.

9. A quick glide lure as defined in claim 1, wherein said fishing hook is attached to said front end, and a loop inclined rearwardly and attached to said rear end for passing a fishing line to be connected to said hook.

10. A quick glide lure as defined in claim 1, wherein said body has at least one hole which is provided near at least one of said ends for attaching said fishing hook to said body through said hole.

11. A quick glide lure as defined in claim 1, wherein said body has lateral sides and is provided with fishing hooks connected with said lateral sides of said body.

12. A quick glide lure as defined in claim 1, wherein said body is provided with a loop arranged on said upper surface on a line which extends through the center of gravity of said body and forms with said upper surface an angle corresponding to a desired angle of said body during fishing.

13. A quick glide lure as defined in claim 1, wherein said body is provided with a through hole arranged on a line which extends through the center of gravity of said body and forms with said upper surface of said body an angle corresponding to a desired angle of said body during fishing.

14. A quick glide lure as defined in claim 1, wherein said body is provided with a plurality of internal peripherally closed holes.

15. A quick glide lure as defined in claim 1, wherein said body is provided with a plurality of holes which communicate with an exterior of said body.

16. A quick glide lure as defined in claim 1, wherein said body has such a shape that a line extending through a center of its upper edge and the center of gravity in the longitudinal vertical cross section forms with a line connecting the upper rear end and the upper front end, and angle of betwen 30° and 60°.

* * * * *